W. HOCHHAUSEN.
Magneto-Electric Machines.
No. 155,237. Patented Sept. 22, 1874.
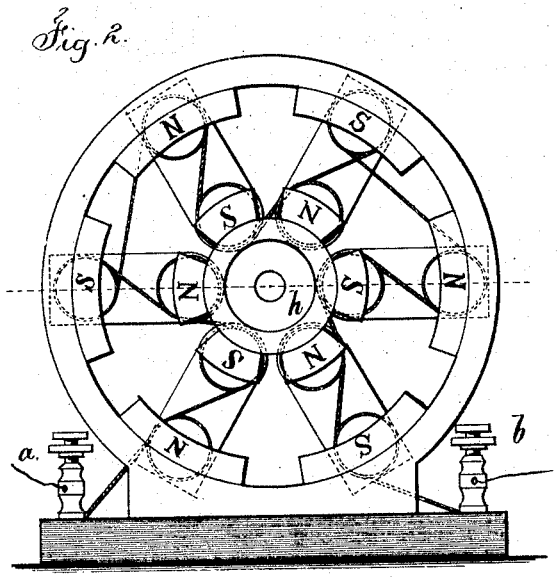
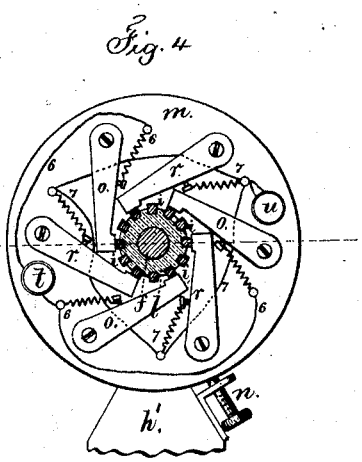
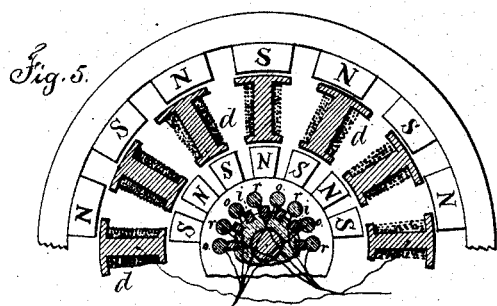
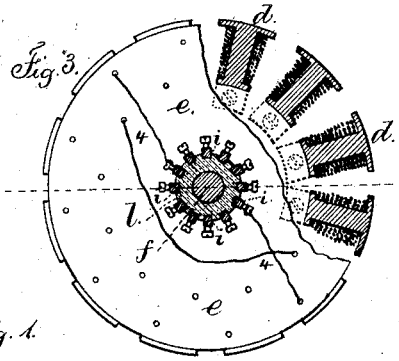
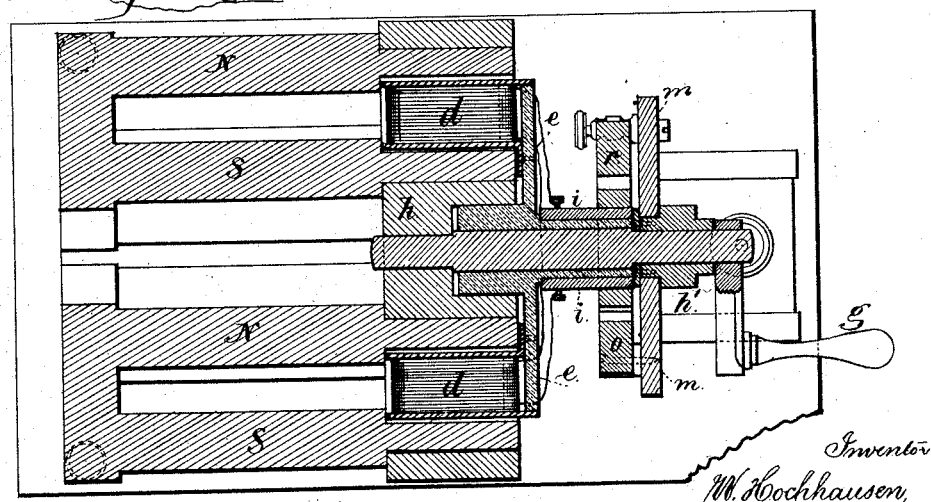

UNITED STATES PATENT OFFICE.

WILLIAM HOCHHAUSEN, OF NEW YORK, N. Y.

IMPROVEMENT IN MAGNETO-ELECTRIC MACHINES.

Specification forming part of Letters Patent No. 155,237, dated September 22, 1874; application filed June 1, 1874.

*To all whom it may concern:*

Be it known that I, WILLIAM HOCHHAUSEN, of the city and State of New York, have invented an Improvement in Magneto-Electric Machines, of which the following is a specification:

I make use of a range of stationary magnets—either electro-magnets or permanent magnets. The poles of each magnet occupy positions radially to a common center, and the poles alternate N S in the circular ranges. Between these magnetic-poles induction-coil armatures are revolved by suitable mechanical power, and the induced currents are conveyed away through a range of circuit-closers to positive and negative binding-screws. These circuit-closers or commutators are upon a stationary but adjustable disk, so as to vary their positions in relation to the magnets of the circular range, and open and close the circuits of the induction-coil armatures as they come successively into the influence of the stationary magnets, or as they leave that influence, thereby causing currents of intensity or quantity to flow from such induction-coil armatures, and if the armatures are of a number corresponding to that of the stationary magnets, the current passing off will be in shocks, and adapted to medical purposes especially. If there are more or less magnets than armatures in the circular ranges, the pulsations will be successive, and so rapid as practically to be continuous, and adapted to various telegraphic and other purposes.

In the drawing, Figure 1 is a sectional plan of the machine. Fig. 2 is an elevation of the stationary magnets. Fig. 3 is an elevation and partial section of the revolving induction-coil armatures. Fig. 4 is an elevation of the commutator; and Fig. 5 is a diagram, showing a different number of induction-coil armatures to stationary magnets.

The magnets N S are either electro-magnets of the polarity indicated, in consequence of the direction in which the helix is wound, the current from a battery or from the machine itself being applied at the binding-screws $a\ b$, or else these magnets are permanent, the magnets being positioned in planes standing radially to a common center, and the poles N S alternating, as indicated; hence the respective poles form two concentric ranges with a space between them, in which are revolved the induction-coil armatures $d$ that are upon a disk, $e$, having a central shaft, $f$, that is revolved by the crank $g$ or other suitable means, and one end of the shaft $f$ rests in the stationary central bearing-block $h$, and the other rests in the removable standard $h'$. Each induction-coil armature is made of a central iron core with a coil of covered wire, and the coils of opposite armatures are connected by a wire, 4, (see Fig. 3,) and the other ends of the helix-wires are connected with the opposite metallic commutator-strips $i\ i$ that are upon an insulating-hub, $l$, around the shaft $f$. There are as many strips $i$ as there are armature-coils, and they are all connected with the respective wires; but to prevent complication only one wire is shown. The disk $m$ is loose upon a hub of the standard $h'$, so that it can be turned around to any desired position and clamped by the screw $n$, or otherwise, and upon this disk there are as many circuit-closing springs or arms $o\ r$ as there are stationary magnets N S, and the ends of these arms $o\ r$ bear upon the commutator-strips $i$. The arms $o$ are connected to the binding-screw $t$ by the wires 6, and the arms $r$ are connected to the binding-screw $u$ by the wires 7.

It will now be understood that when the shaft $f$, disk $e$, and induction-coil armatures $d\ d$ are revolved by competent power, the current set up in the said coils will be alternately positive and negative, and this will be heightened by the reactionary effect of the discharge, and the connections through $i\ i$ will be made simultaneously to the positive and negative binding-screws through $o$ and $r$ and $r$ and $o$ alternately, and the current will flow either in shocks or so nearly uniform that any inconstancy will not be appreciable, because when the number of induction-coil armatures differs from the number of magnets, the connections through the commutator and the discharges will follow each other in such rapid succession as not to be distinguishable, for with fourteen magnets and thirteen armatures, as illustrated in Fig. 5, and with a revolution of two thousand turns per minute, there would be about one hundred and ninety-six thousand pulsations per minute.

If the position of the disk is such that the circuit connection through $i\ 4$ and $o\ r$ is broken as the armature-coil is about midway between the entering and leaving points, the current will be one of quantity; but if the disk is turned so that the connections aforesaid will be broken as the armature-coil passes out from between the stationary magnet, then the current will be one of intensity. As before remarked, the shocks will be the most marked when the induction-coil armatures and the stationary magnets correspond in number, because the induction-discharges will be simultaneous from all the coils; but in all instances, the opposite coils being connected to each other, and to the respective commutator-strips, and being of opposite polarity in consequence of the arrangement of the stationary magnet, the induced current will be positive and negative, and pass simultaneously to the respective binding-screws through the circuit-closing arms or springs $o\ r$.

I am aware that magneto-electric machines have been made with the stationary magnets placed radially to the center on which the induction-coils are revolved; and also that the permanent or stationary magnets have been arranged in circular and parallel groups with the induction-coils revolving between the ends of the groups.

By my improvement, the stationary magnets occupy a horizontal and parallel position to each other in the circular ranges, and the induction-coil armatures revolve in the annular space between the magnets, thereby utilizing the space and allowing for the use of powerful stationary magnets in a small machine.

I claim as my invention—

The stationary magnets, parallel or nearly so to each other, and placed in a circular range with their poles alternating, in combination with the circular range of induction-coil armatures revolved within the annular space between the poles, and with the adjustable disk and commutator connecting the induction-coils with the binding-screws, substantially as set forth.

Signed by me this 21st day of May, A. D. 1874.

W. HOCHHAUSEN.

Witnesses:
  GEO. T. PINCKNEY,
  CHAS. H. SMITH.